Figure 1:
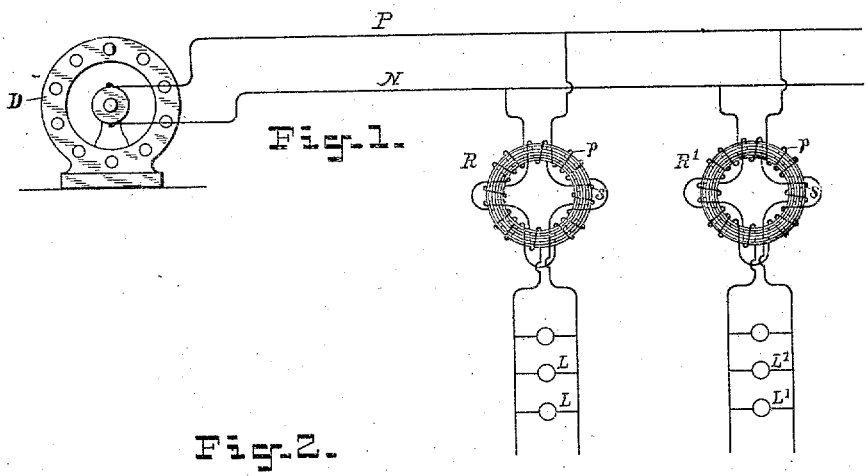

R. KENNEDY.

Assignor, by mesne assignments, to THE WESTINGHOUSE ELECTRIC COMPANY.

SYSTEM OF ELECTRICAL DISTRIBUTION.

No. 11,031. Reissued Sept. 24, 1889.

Witnesses
George Brown Jr.
James Wm. Smith.

Inventor
Rankin Kennedy
By his Attorney
Charles A. Troy.

THE NORRIS PETERS CO., WASHINGTON, D. C.

UNITED STATES PATENT OFFICE.

RANKIN KENNEDY, OF GLASGOW, COUNTY OF LANARK, SCOTLAND, ASSIGNOR, BY MESNE ASSIGNMENTS, TO THE WESTINGHOUSE ELECTRIC COMPANY, OF PITTSBURG, PENNSYLVANIA.

SYSTEM OF ELECTRICAL DISTRIBUTION.

SPECIFICATION forming part of Reissued Letters Patent No. 11,031, dated September 24, 1889.

Original No. 407,294, dated July 16, 1889. Application for reissue filed August 28, 1889. Serial No. 322,251.

*To all whom it may concern:*

Be it known that I, RANKIN KENNEDY, a subject of the Queen of Great Britain, and a resident of Glasgow, county of Lanark, Scotland, have invented a new and useful Improvement in the Method of Distributing and Regulating Alternating Electric Currents by Secondary Generators, (Case 232,) of which the following is a specification.

In systems of distribution by alternating electric currents employing stationary induction-coils or secondary generators it was customary, in the practical use of secondary generators prior to my invention, to connect all the primary coils in the circuit of the source of alternating currents in series. In such an organization the primary conductors of all the secondary generators are traversed in succession by one and the same current, and as a consequence any variation in the resistance opposed to the passage of the current through any one primary coil produced a corresponding variation in the current flowing through the primary coil of all the other secondary generators. It was found in practice that opening the secondary circuit of any of the secondary generators resulted in greatly diminishing the current delivered to all the others, and thus the entire system would be disturbed by turning off the lights at any one point. No entirely satisfactory method of overcoming this defect has been discovered. I have found that a counter electro-motive force is set up in a coil of wire carrying an alternating current and wound upon an iron core, and this counter electro-motive force is proportionate to the size of the iron core and the length of wire in the coil surrounding the core. I have also found that when the secondary circuit of a properly-constructed secondary generator is open or disconnected and an alternating electric current is applied to the primary coil a counter electro-motive force is developed in the primary coil which is practically equal to the applied electro-motive force. When, however, secondary currents are allowed to develop in the secondary coil, the counter electro-motive force is so modified that a primary current flows which varies approximately inversely as the resistance offered to the development of the secondary current. Availing myself of this discovery, I have devised a new method of distribution of energy by alternating electric currents, by which the secondary generators are rendered independent and self-governing, each receiving its appropriate current independently of all the others and each deriving from the source an amount of energy proportionate to that which is actually consumed in the secondary circuit. In carrying this method into operation the primary coils of the secondary generators are connected with the source of energy in branch or derived circuits and the secondary coils are closed through the lights arranged in parallel arc. In such an organization each secondary generator receives its current independently of all the others and the primary current in each secondary generator increases as the resistance in its secondary circuit decreases; or, in other words, the primary current increases as the current in the secondary circuit increases. From this it follows that the energy supplied to the primary coil or consumed by the secondary generator may be made nearly directly proportional to the work being done, and the whole system becomes self-regulating and flexible.

Figure 2:
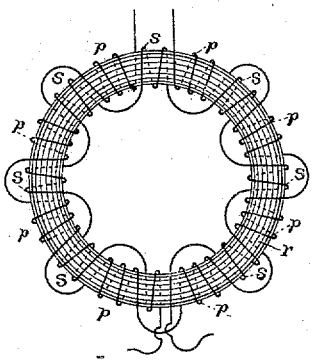
Figure 3:
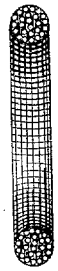

In the accompanying drawings, Figure 1 is a diagram illustrating my improved organization of apparatus for electrical distribution, in which two secondary generators are shown connected with the source in parallel arc. Fig. 2 is a diagram illustrating the principle of construction of one of the individual secondary generators. Fig. 3 is a cross-section of the same.

Referring to Fig. 1, D represents a source of electric energy, which may be a dynamo-electric machine or other proper apparatus for producing alternating electric currents. Two secondary generators (which are a sufficient number to illustrate the principle of the invention) are shown at R and R′. These have their primary conductors *p p* connected in parallel between the main conductors P and N, which extend from the terminals of the source of electricity D. Groups of lamps are shown at L and L′, placed in parallel and included in the secondary circuits *s s* of the respective secondary generators.

In order to obtain the counter electro-motive effect which I have mentioned, I employ a secondary generator in which the size of the iron core and the length of the primary coil surrounding it are proportionate to the electro-motive force applied thereto. An example of such a secondary generator is illustrated in Figs. 2 and 3. This consists of a core of soft iron composed of iron wire in the form of an endless ring, upon which two coils of insulated wire are wound. One coil constitutes the primary and the other the secondary conductor of the secondary generator. I have shown the primary coil wound in sections *p p p p* and the secondary in sections *s s s s*, arranged alternately upon the cores. When two or more such secondary generators have their primary conductors connected in parallel arc and their secondary circuits disconnected or open, the counter electro-motive force is so great that practically no current passes through the primary conductors; hence when no work is being done in the secondary circuits little or no energy is wasted. When, however, the secondary circuit of any given secondary generator is closed through a greater or less number of parallel branches containing lamps or other translating devices, then a secondary current is generated in the secondary wire, the effect of which is to neutralize the counter electro-motive force proportional to the amount of work being done. These changes take place without modifying the value of the current traversing the primaries of the other secondary generators or affecting in any way the operation of the translating devices in their secondaries. The same is equally true of any of the other secondary generators or any number of them connected in the same manner, and it follows that the system is an automatically self-regulating as well as a very economical one.

I claim as my invention—

The method of distributing and regulating alternating electric currents by secondary generators, which consists in producing in two or more derived circuits constituting the primaries of two or more secondary generators a counter electro-motive force which, when any secondary is open, is practically equal to the applied electro-motive force in its primary and in controlling said electro-motive force by the current flowing in the corresponding secondary when the secondary is closed in such manner that the current in the primary shall vary with and be approximately inversely proportional to the resistance in the secondary, substantially as described.

In testimony whereof I have hereunto subscribed my name this 27th day of August, A. D. 1889.

RANKIN KENNEDY.

Witnesses:
CHARLES A. TERRY,
W. D. UPTEGRAFF.